(12) United States Patent
Srinivas et al.

(10) Patent No.: US 9,015,283 B2
(45) Date of Patent: Apr. 21, 2015

(54) ROAMING PROFILES AND APPLICATION COMPATIBILITY IN MULTI-USER SYSTEMS

(75) Inventors: Nelamangal Krishnaswamy Srinivas, Sammamish, WA (US); Ashwin Palekar, Sammamish, WA (US); Olga B. Ivanova, Redmond, WA (US); Ara Bernardi, Mercer Island, WA (US); Sriram Sampath, Redmond, WA (US)

(73) Assignee: Microsoft Technology, Redmond, WA (US)

( * ) Notice: Subject to any disclaimer, the term of this patent is extended or adjusted under 35 U.S.C. 154(b) by 843 days.

(21) Appl. No.: 12/642,646

(22) Filed: Dec. 18, 2009

(65) Prior Publication Data

US 2011/0153781 A1 Jun. 23, 2011

(51) Int. Cl.
*G06F 15/16* (2006.01)
*G06F 9/445* (2006.01)

(52) U.S. Cl.
CPC .................................. *G06F 9/4451* (2013.01)

(58) Field of Classification Search
USPC .................. 709/219, 204, 217, 218, 227, 246
See application file for complete search history.

(56) References Cited

U.S. PATENT DOCUMENTS

| | | | |
|---|---|---|---|
| 6,982,733 B1 * | 1/2006 | McNally et al. | 715/810 |
| 2006/0003763 A1 * | 1/2006 | Almgren | 455/432.1 |
| 2006/0031529 A1 | 2/2006 | Keith | |
| 2008/0172478 A1 * | 7/2008 | Kiyohara et al. | 709/220 |
| 2009/0006537 A1 | 1/2009 | Palekar et al. | |
| 2009/0319580 A1 * | 12/2009 | Lorenz et al. | 707/203 |
| 2010/0037235 A1 * | 2/2010 | Larimore et al. | 719/312 |
| 2010/0262958 A1 * | 10/2010 | Clinton et al. | 717/171 |
| 2010/0268844 A1 * | 10/2010 | Quinlan et al. | 709/238 |
| 2012/0089710 A1 * | 4/2012 | Rakowski et al. | 709/220 |

OTHER PUBLICATIONS

Anderson, C., "Making Profiles Work," Jun. 6, 2004, 3 pages, http://www.ccaheaven.com/TSE%20profile%20issues.htm.
"Managed Profile," retrieved Oct. 15, 2009, 1 page, downloaded at http://www.managedprofile.com/products.asp.
MSTerminalServices.org, "Profile & User Environment Management," Jul. 7, 2004, 5 pages, http://www.msterminalservices.org/software/Profile-&%20user%20environment%20management/.
Nord, J., "App Streaming and Roaming Profiles—UPM," Sep. 26, 2008, 9 pages, http://community.citrix.com/display/ocb/2008/09/26/App+Streaming+and+Roaming+Profiles+-+UPM.
Quest—Desktop Virtualization, retrieved Oct. 15, 2009, 2 pages, downloaded at https://www2.provisionnetworks.com/docs/featurelist012009.pdf.
Yu, Y., "OS-Level Virtualization and Its Application," Abstract of the Dissertation, Stony Brook University, Dec. 2007, 134 pages, http://www.ecsl.cs.sunysb.edu/tr/TR223.pdf.

\* cited by examiner

*Primary Examiner* — Lan-Dai T Truong
(74) *Attorney, Agent, or Firm* — Jim Banowsky; Sade Fashokun; Micky Minhas

(57) ABSTRACT

Systems, methods, and computer-readable storage media are disclosed for roaming profiles and application compatibility in multi-user systems. In an embodiment, a user profile exists on a plurality of client computers. Each client computer executes a roaming profile client that intercepts a change to an application's settings. The roaming profile client sends this change to a roaming profile server that stores it. When the user profile logs on to a second client computer, the roaming profile server sends an indication of the change to a second roaming profile client on the second client computer. This roaming profile client alters the settings for the application on the second client computer such that, when the user session executes the application on the second client computer, the application reflects the change.

20 Claims, 6 Drawing Sheets

402 receiving an indication that a change has been made to an application in a user account on a first computing device

▼

404 storing an indication of the change

▼

406 determining that the user account is logged into a second computing device

▼

408 sending the second computing device an indication of the change, wherein the second computing device is configured to execute the application and reflect the change

▼

410 receiving an indication that a second change has been made to the application in the user account on a third computing device, the change and the second change affecting an aspect of the application; and determining to indicate the change to the second computing device based on a merge policy that governs the change and the second change

▼

412 receiving an indication that a second change has been made to the application in the user account on a third computing device, the change and the second change affecting an aspect of the application; and determining to indicate a sub-change of the change, and a sub-change of the second change to the second computing device based on a merge policy that governs the change and the second change

FIG. 4

ROAMING PROFILES AND APPLICATION COMPATIBILITY IN MULTI-USER SYSTEMS

BACKGROUND OF THE INVENTION

It is common for users to use a plurality of computers. A single user may use a desktop computer at his place of employment, a second desktop computer at his residence, and a laptop computer when he is traveling. Sometimes, he may even use all three of these computers in the span of a single day.

Where the user changes an application's settings—such as the preferred font or dictionary for a word processor—on one computer he may wish or expect to have those changes applied to his application on each computer that he uses. Where these changes are not applied across the computers he uses, the user experienced is diminished because of both inconsistent application settings between computers, and the required time and effort to manually implement the changes on each computer.

One scenario where this occurs is where a user is running a particular word processor on a desktop computer and creates a new style. The user expects that new style to be present on his laptop when he leaves for a business trip with the laptop. Further, when the user is on that business trip, he changes a font setting in the word processor, and expects that to be present when he uses the application on his desktop computer.

Another scenario where this occurs is where the user is running a word processor on his desktop computer. Further, he is running an email program through a remote presentation session (such as REMOTE DESKTOP SESSION® or virtual desktop infrastructure), the email program using a different instance of that word processor (one executed on the remote presentation session server along with the email program) to edit documents. Where the user creates a new style for the word processor executed on the desktop computer, he may expect that it also exists for the word processor associated with the email program that he is using, and vice versa.

The problem exists both for where a user only logs in locally to computers, but is more pronounced when remote presentation sessions are involved. It is common for a remote presentation server to be part of a server farm—a plurality of servers configured to conduct remote presentation sessions, and assigned to remote presentation sessions by a load balancer that routes incoming connections to an available server based on which server has the most available processing resources.

So, a user may log onto a first remote presentation session server and makes some changes to application settings, then logs off. He may log back on to a remote presentation session of the very same server farm, but be assigned to a second remote presentation session server by the load balancer, and it may be that the changes he made to the application settings are either not reflected in this second session, or only partially reflected in this second session.

There do exist techniques for roaming profiles, but these pre-existing roaming profile techniques have significant limitations. Among other limitations, first, these roaming profiles are roamed only on a per-user basis, and lack the granularity to roam individual applications of a user's profile (referred to as "per-user, per-application" roaming in the detailed description). Second, this per-user roaming lacks granularity even at the user level. So, if a user updates different parts of his profile on different computers, whichever computer roams the user profile last will overwrite all changes made to the profile on the other computer.

SUMMARY OF THE INVENTION

It would, therefore be an improvement to enable per-user, per-application roaming profiles for a user that propagate application settings across the user's computers. Systems, methods, and computer-readable storage media are disclosed herein for such roaming profiles.

In an embodiment, a plurality of computers used by the user execute a roaming profile client. This client monitors a user's computing session to determine when a change to an application has been made.

This monitoring may be done, for instance, through application virtualization, where a virtualization layer executing between the application and the operating system upon which it runs intercepts some or all system calls by the application. This monitoring may also be done, for example, by implementing a filter driver on a filter of the operating system to perform the intercepting. This monitoring may also be done, for example, by instrumenting some or all system calls by re-writing the in-memory code for those system calls.

After the system call has been intercepted, the roaming profile client may determine whether the call, when executed, is going to change a setting for an application. This may be determined, for instance, if it will alter a file system of the operating system, or a program registry. Where it is determined that the user's settings for the application will be roamed, and that the system call will change user's settings for the application, the roaming profile client may send an indication of this to a computer executing a roaming profile server 214, which stores it.

When the user logs onto a second computer that also executes a roaming profile client, the server may send an indication of the application change to the user, such that, when the user executes the application, the application reflects the change.

Here and below, the primary embodiment described utilizes system calls to make changes to application settings. This is for illustrative purposes and not intended to teach away from other techniques to make changes to application settings.

The primary embodiments described herein discuss computer-executable instructions executed by one or more processors of a computing device. However, it may be appreciated that these techniques may be implemented entirely in terms of hardware, such as through appropriately programming field-programmable gate arrays (FPGAs), or some combination thereof. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer-readable media for improved roaming profiles are further described with reference to the accompanying drawings in which:

FIG. 4 illustrates example operating procedures for a roaming profile server 214.

DETAILED DESCRIPTION OF ILLUSTRATIVE EMBODIMENTS

Figure 1:
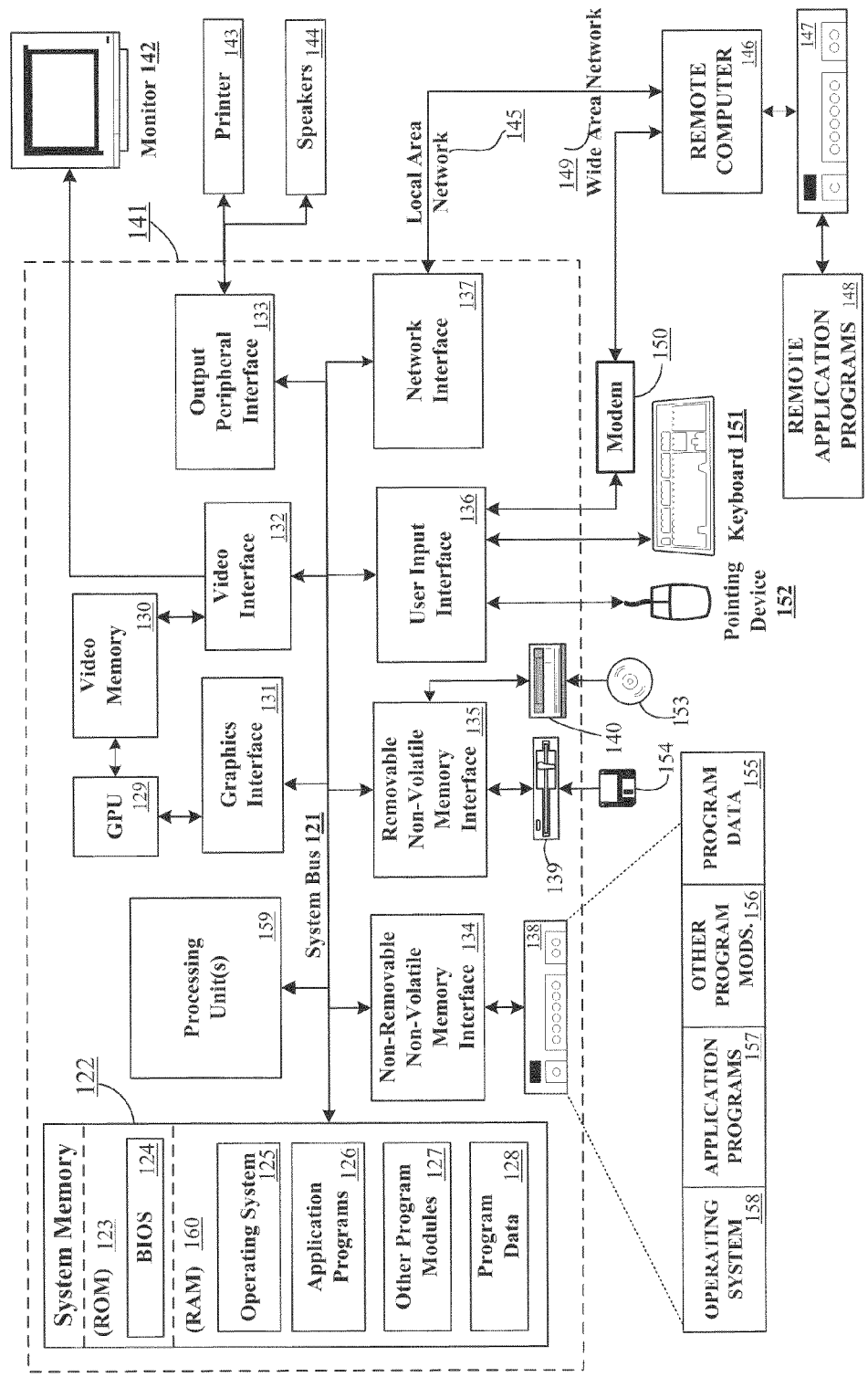
FIG. 1 illustrates an example general purpose computing environment in which in which the techniques described herein may be embodied.

FIG. 1 is a block diagram of a general purpose computing device in which the techniques described herein may be employed. The computing system environment 120 is only one example of a suitable computing environment and is not intended to suggest any limitation as to the scope of use or functionality of the presently disclosed subject matter. Neither should the computing environment 120 be interpreted as having any dependency or requirement relating to any one or combination of components illustrated in the example operating environment 120. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 141 typically includes a variety of computer-readable media. Computer-readable media can be any available media that can be accessed by computer 141 and includes both volatile and nonvolatile media, removable and non-removable media. The system memory 122 includes computer-readable storage media in the form of volatile and/or nonvolatile memory such as read only memory (ROM) 123 and random access memory (RAM) 160. A basic input/output system 124 (BIOS), containing the basic routines that help to transfer information between elements within computer 141, such as during start-up, is typically stored in ROM 123. RAM 160 typically contains data and/or program modules that are immediately accessible to and/or presently being operated on by processing unit 159. By way of example, and not limitation, FIG. 1 illustrates operating system 125, application programs 126, other program modules 127, and program data 128.

The computer 141 may also include other removable/non-removable, volatile/nonvolatile computer storage media. By way of example only, FIG. 1 illustrates a hard disk drive 138 that reads from or writes to non-removable, nonvolatile magnetic media, a magnetic disk drive 139 that reads from or writes to a removable, nonvolatile magnetic disk 154, and an optical disk drive 140 that reads from or writes to a removable, nonvolatile optical disk 153 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 138 is typically connected to the system bus 121 through an non-removable memory interface such as interface 134, and magnetic disk drive 139 and optical disk drive 140 are typically connected to the system bus 121 by a removable memory interface, such as interface 135.

The drives and their associated computer storage media discussed above and illustrated in FIG. 1, provide storage of computer-readable instructions, data structures, program modules and other data for the computer 141. In FIG. 1, for example, hard disk drive 138 is illustrated as storing operating system 158, application programs 157, other program modules 156, and program data 155. Note that these components can either be the same as or different from operating system 125, application programs 126, other program modules 127, and program data 128. Operating system 158, application programs 157, other program modules 156, and program data 155 are given different numbers here to illustrate that, at a minimum, they are different copies. A user may enter commands and information into the computer 141 through input devices such as a keyboard 151 and pointing device 152, commonly referred to as a mouse, trackball or touch pad. Other input devices (not shown) may include a microphone, joystick, game pad, satellite dish, scanner, or the like. These and other input devices are often connected to the processing unit 159 through a user input interface 136 that is coupled to the system bus, but may be connected by other interface and bus structures, such as a parallel port, game port or a universal serial bus (USB). A monitor 142 or other type of display device is also connected to the system bus 121 via an interface, such as a video interface 132. In addition to the monitor, computers may also include other peripheral output devices such as speakers 144 and printer 143, which may be connected through a output peripheral interface 133.

The computer 141 may operate in a networked environment using logical connections to one or more remote computers, such as a remote computer 146. The remote computer 146 may be a personal computer, a server, a router, a network PC, a peer device or other common network node, and typically includes many or all of the elements described above relative to the computer 141, although only a memory storage device 147 has been illustrated in FIG. 1. The logical connections depicted in FIG. 1 include a local area network (LAN) 145 and a wide area network (WAN) 149, but may also include other networks. Such networking environments are commonplace in offices, enterprise-wide computer networks, intranets and the Internet.

When used in a LAN networking environment, the computer 141 is connected to the LAN 145 through a network interface or adapter 137. When used in a WAN networking environment, the computer 141 typically includes a modem 150 or other means for establishing communications over the WAN 149, such as the Internet. The modem 150, which may be internal or external, may be connected to the system bus 121 via the user input interface 136, or other appropriate mechanism. In a networked environment, program modules depicted relative to the computer 141, or portions thereof, may be stored in the remote memory storage device. By way of example, and not limitation, FIG. 1 illustrates remote application programs 148 as residing on memory device 147. It will be appreciated that the network connections shown are example and other means of establishing a communications link between the computers may be used.

Figure 2:
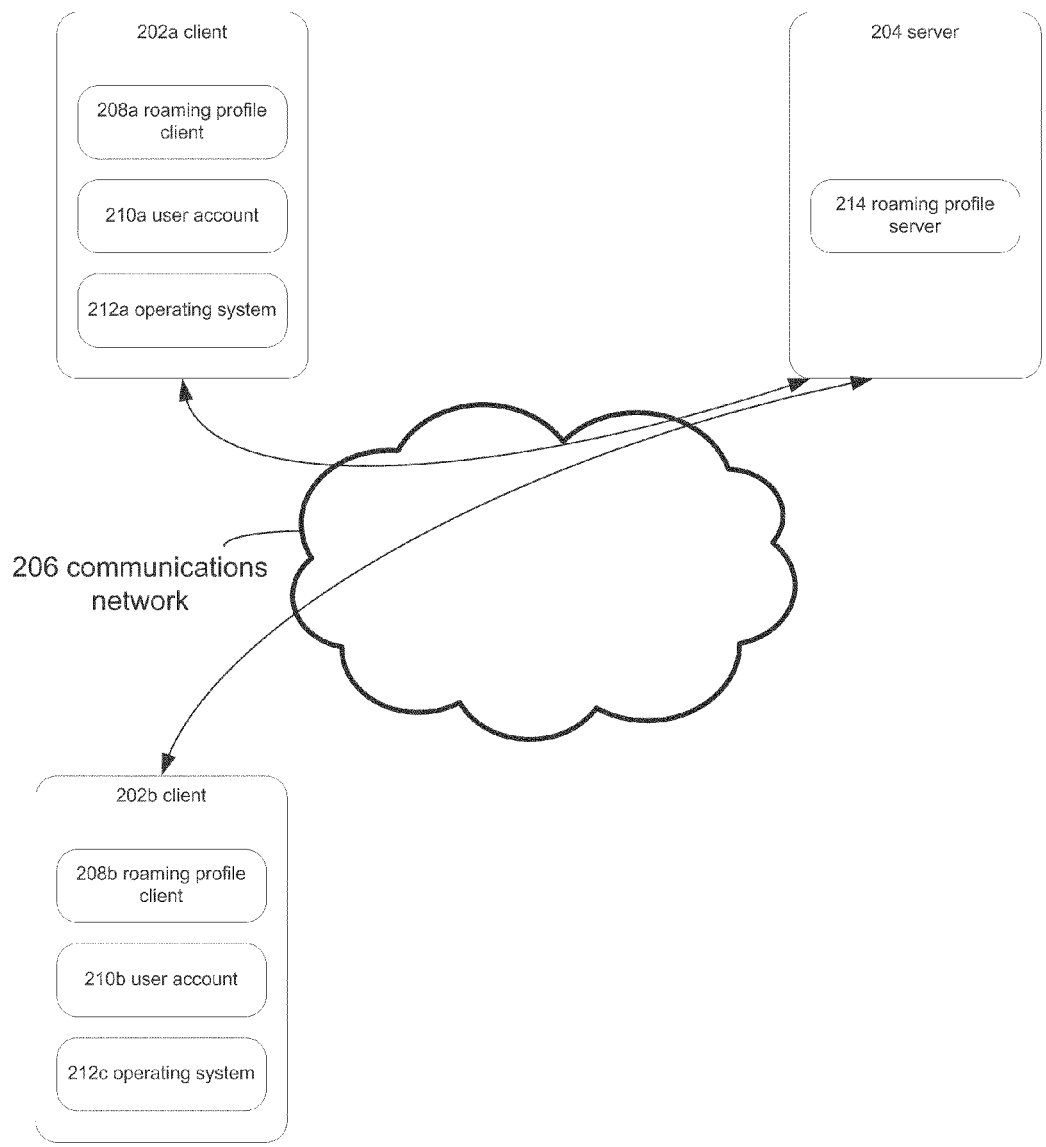
FIG. 2 illustrates a networked computing environment in which roaming profiles may be implemented.

FIG. 2 illustrates a networked computing environment in which roaming profiles may be implemented.

Client 202a and server 204 communicate across communications network 206. In an embodiment, client and server 204 each comprise computing system environment 120 of FIG. 1. Client 202a executes roaming profile client 208a and server 204 executes roaming profile server 214.

Client 202a executes user account 210a. User account 210a may comprise a computing session associated with a user, such as when a user logs in to client 202a using his account credentials (like user name and password). This act of logging on may comprise logging on to a computer to use it locally, or logging on to some remote presentation session, such as REMOTE DESKTOP SESSION® or virtual desktop infrastructure. User account 210a executes one or more applications. Roaming profile client 208a monitors the interaction between the application and an operating system 212a of user account for instances where the user may change one or more settings of the application. Application settings as used herein may also refer to settings of an operating system, particularly when the term is used to refer to operating systems that include functionality outside of the basic operating system feature set, like a clock or a graphical file browser.

A change of settings may involve, for example, a change to a program registry of operating system 212a (such as the WINDOWS® operating system registry), or a change to a file system of operating system 212a, such as altering a preferences file associated with the application (for example, C:\Users\John Doe\Programs\Text Editor\Text Editor Prefs.txt in a WINDOWS® file system), or an initialization file of the application.

Roaming profile client 208a may monitor this interaction by detecting system calls to operating system 212a by the application that cause these application settings. Roaming profile client 208a may detect system calls in a variety of ways. Where application is virtualized (using technologies such as a virtual file system (VFS), a virtual registry (V-Reg), or a virtual component object model (COM) (V-Com)), a virtualization layer in which application is executed may intercept these system calls and send them to roaming profile client 208a.

Roaming profile client 208a may also detect system calls, for example, by implementing a filter driver on a filter of operating system 212a (such as NTFS.dll in some versions of the WINDOWS® operating system) to perform the intercepting. Further, roaming profile client may detect system calls by instrumenting some or all system calls by re-writing the in-memory code for those system calls.

A combination of techniques may be used to detect system calls. In an embodiment, roaming profile client 208a detects a change to a program registry through application virtualization, and a change to a file system through a filter driver.

In an embodiment where all detected system calls are sent to roaming profile client 208a, when a system call is detected, roaming profile client 208a may determine whether the system call corresponds to a change of the application's settings. For example, the system call may not involve a change of settings, like to read from memory, or it may not involve a change to the application's settings, such as if a second application made the system call. It may be, as discussed in more detail below, that a subset of applications executed by the user account are to be roamed, and the second application is not among that subset.

In an embodiment where the entity performing the operation of interception may selectively intercept system calls, the discrimination between system calls may occur at that point, so that all intercepted system calls received by roaming profile client 208a correspond to a change to the application's settings and are to be roamed.

In an embodiment, intercepted system calls are also sent through to their intended target of the operating system, so that the calls are executed on client 202a. In an embodiment, intercepted system calls are not sent through to the intended target without modification so that the application changes are virtualized. For example, roaming profile client 208a may keep its own system registry, and where the application attempts to modify operating system 212a's system registry through system calls, those calls are modified so that they affect roaming profile client 208a's system registry.

After roaming profile client 208a determines that the system call corresponds to a change in the application, it sends an indication of this change to roaming profile server 214 on server 204 through communication network 206. This indication may comprise the system call itself, or some other way of signifying the effect of executing the system call, such as a change to be made to a registry. This signifying may comprise sending the user name, the application and version number, and what is changed. For instance, a registry change of "[User XYZ; Application—MS Word Version 9.0; Registry key—HKCU\software\Microsoft\Office\MSWord\Font—changed to Calibri]" that may be effectuated locally with a system call to write to the registry, may be sent as data that signifies "[User—XYZ; Application—MS Word Version 9.0; Setting—font changed to Calibri]"

Roaming profile server 214 stores an association between user account and the indication, such as in a database.

User account then logs in to client 202b. In response to this, roaming profile client 208b communicates with roaming profile server 214 across communications network 206. Roaming profile server 214 sends roaming profile client 208b an indication of changed application settings that it stores. In an embodiment, roaming profile server 214 stores all roamed application settings, whether changed or not since roaming profile server 214 and roaming profile client 208b last exchanged application settings, and sends all those roamed settings to roaming profile client 208b. Roaming profile client 208b implements these changes to the application's settings such that when user account 210b executes the application in operating system 212b, the application reflects the changed settings.

In an embodiment, the application executed by user account 210a and the application executed by user account 210b comprise the same version of the application—e.g. version 5.4.0 of a particular text editor. In an embodiment where a particular application's settings and how they are stored remain constant from version to version, roaming profiles may be used for that application across compatible versions. In an embodiment, roaming profile server 214 and/or roaming profile client 208b may be configured to transform a change to settings between versions of applications. For instance, where a preferences file is identical, save for being stored in a different location in the file system, roaming profile server 214 and/or roaming profile client 208b may be configured to handle this by directing a particular version of the application to change its settings in accordance with the particulars of that version.

In an embodiment, user account 210 executes in a virtual machine within a guest partition and managed by a virtual machine manager ("VMM") on client 202a. The VMM may be, for instance, MICROSOFT's HYPERV™ or VMWARE's ESX™. An operating system may execute within the virtual machine, and user account 210 may be an account for this operating system.

Figure 3:
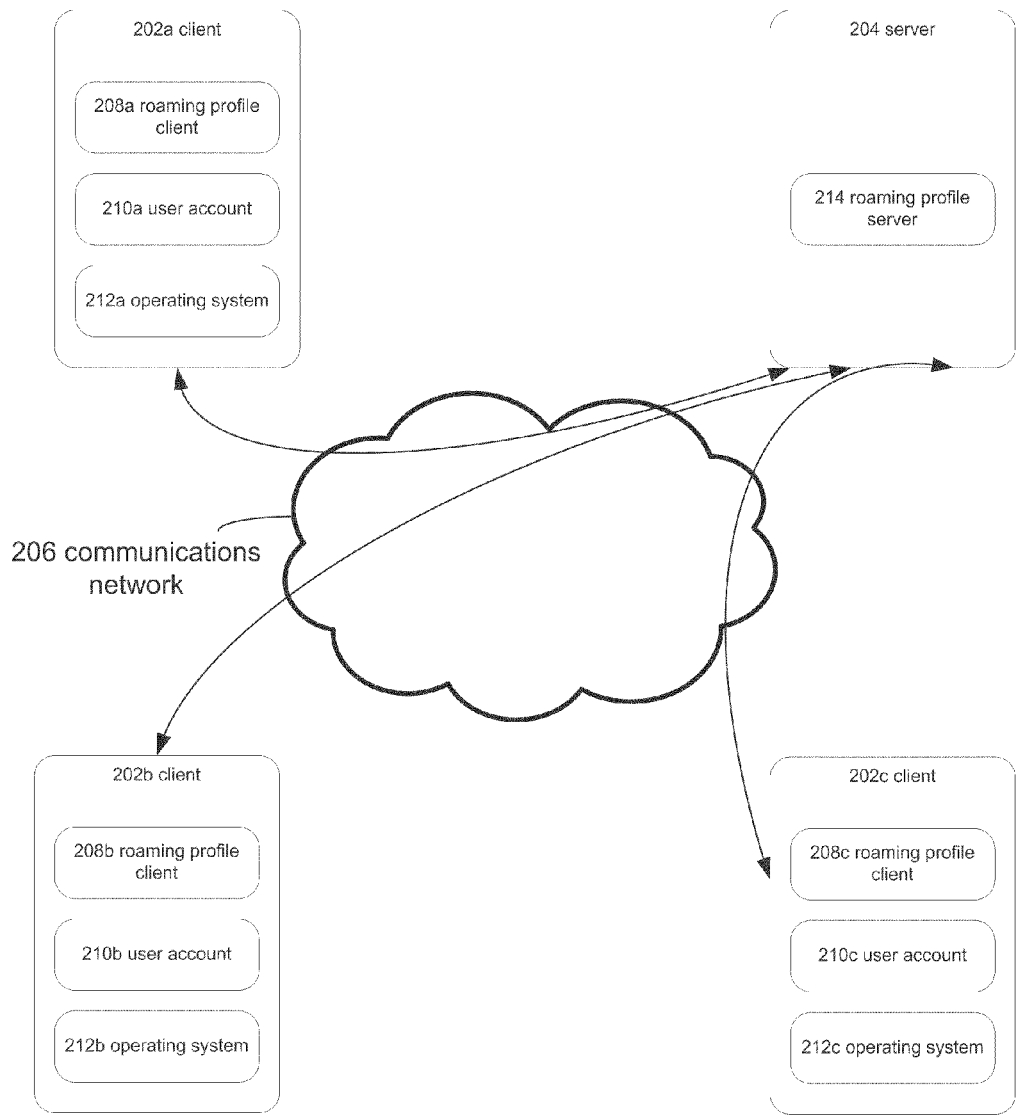
FIG. 3 illustrates a networked computing environment in which roaming profiles with conflict management may be implemented.

FIG. 3 illustrates a networked computing environment in which roaming profiles with conflict management may be implemented.

Where user account 210a is active on client 202a and executing an application at the same time that user account 210c is active on client 202c and executing another instance of the application on operating system 212c, it may be possible for a change to be made to the application's settings in two places concurrently. This can be managed through use of a merge policy on server 204.

For instance, a change to the same setting for the application may be made at both client 202a and client 202c, such as client 202a changing the default font color for the application to black and client 202c changing the same to blue. A variety of merge policies may be implemented to handle such a situation. Where changes are sent by roaming profile client to roaming profile server 214 as they are made, roaming profile server 214 may implement the most recently received change. Where changes are sent by roaming profile client to roaming profile server 214 periodically, roaming profile client may attach a timestamp to each change made, and send that to roaming profile server 214 along with an indication of the change. Roaming profile server 214 may then implement the change according to its merge policy, such as the previously discussed most recently received change.

Client 202a and client 202c may make changes to the same application, but that affect different settings. For instance roaming profile client 202a may change the default font color, as above, but client 202c may change a default location to save a file generated with the application. Additionally, client 202a and client 202c may make changes to different applications, such as to a text editor and a web browser, respectively. These changes may be thought of as non-conflicting, in that no change impacts or overwrites another change from being implemented. Where this is the case, roaming profile server 214 may implement a merge policy where all such changes are implemented.

It may be that a combination of these two types of changes—conflicting and non-conflicting—are made. This could occur, for instance, where client 202a changes the application's default font color and default save location, and client 202c changes the application's default save location, as well. Roaming profile server 214 may merge these changes using respective conflicting and non-conflicting merge policies, as discussed above, respectively.

When user account 210b logs on to client 202b, roaming profile client 208b then receives an indication of the merged changes made by client 202a and client 202b from roaming profile server 214.

Such merging may be implemented, for instance, by a transactional database stored by roaming profile server 214 that will enable roaming profile server 214 to resolve potential conflicts (including profile corruption problems), using such transactional database techniques as rollback.

Such merging may be used to combine profiles from different locations according to a policy. For instance, a particular merge policy may dictate that word processor and email settings are to be roamed and retrieved from roaming profile server 214, and that all other application settings are to use their local values.

In an embodiment where client 202a is conducting a remote presentation session with server 204 and, in the course of that session, makes a change to the settings an application executing on server 204, an agent on roaming profile server may detect that change as it occurs on server 204.

Where multiple clients are each conducting a remote presentation session with server 204 at the same time, server may execute such an agent for each remote presentation session, such as in the user space of each remote presentation session. In an embodiment involving these multiple remote presentation sessions at the same time, server 204 may execute a single agent (such as in server 204's kernel space) that detects changes to application settings as they are made by all of the clients conducting remote presentation sessions.

FIG. 4 illustrates example operating procedures for a roaming profile server 214.

Operation 402 depicts receiving an indication that a change has been made to an application in a user account on a first computing device. This may, for instance, comprise receiving, by roaming profile server 214, a message from roaming profile client 202a (where user account 210a is or was active) across communications network 206 indicating this.

Operation 404 depicts storing an indication of the change. This change may be stored by roaming profile server 214 in a database on server 204.

Operation 406 depicts determining that the user account is logged into a second computing device. When the user account logs into a second computing device 202b, an instance of roaming profile client 208b may send roaming profile server 214 a message indicative of this log in.

Operation 408 depicts sending the second computing device an indication of the change, wherein the second computing device is configured to execute the application and reflect the change. Roaming profile server 214 may look up in its database any profile information for user account and send it to roaming profile client 208b, along with an indication of how the information is to be used to implement changes (such as that the information should be stored as an initialization or preference file for the changed application).

Operation 410 depicts receiving an indication that a second change has been made to the application in the user account on a third computing device, the change and the second change affecting an aspect of the application; and determining to indicate the change to the second computing device based on a merge policy that governs the change and the second change. Where the user account is logged into a plurality of computers, such as client 202a and client 202c, either concurrently or not, and changes to a single application are made at both clients 202a and 202c, these changes may need to be reconciled according to a merge policy, as is discussed in more detail with respect to FIG. 3.

In an embodiment, the user account is logged into the first computing device concurrently with the user account being logged into the third computing device. For instance, user account 210a may be active on client 202a concurrently with user account 210c being active on client 202c.

Operation 412 depicts receiving an indication that a second change has been made to the application in the user account on a third computing device, the change and the second change affecting an aspect of the application; and determining to indicate a sub-change of the change, and a sub-change of the second change to the second computing device based on a merge policy that governs the change and the second change. As also is discussed in more detail with respect to FIG. 3, changes may be incorporated from both client 202a and client 202c, rather than from only either client 202a or client 202c when both client 202a or client 202c make a change to a particular application.

Figure 5:
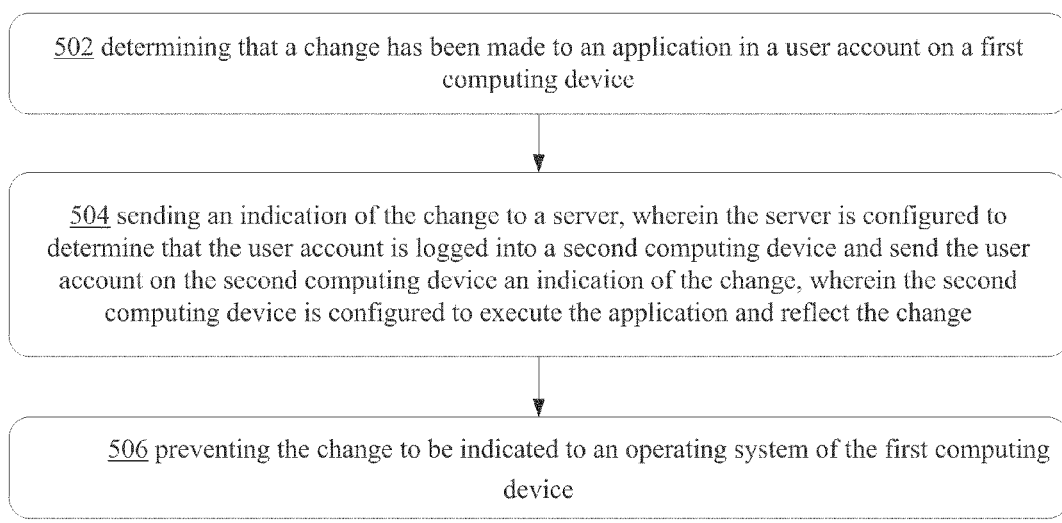
FIG. 5 illustrates example operating procedures for a roaming profile client.

FIG. 5 illustrates example operating procedures for a roaming profile client.

Operation 502 depicts determining that a change has been made to an application in a user account on a first computing device.

In an embodiment, a change comprises a change to the application's settings.

In an embodiment, determining that a change has been made comprises determining that a change has been made at a driver stack of the first computing device, such as through use of a filter driver. In an embodiment, this determining includes determining that a second change has been made to the application by re-writing in-memory code for a target function on the first computing device (like client 202a), such as through use of MICROSOFT DETOURS®; and sending an indication of the second change to the server 204, wherein the server 204 is configured to send a user account (like user account 210b) on the second computing device (like client 202c) an indication of the second change, wherein the second computing device is configured to execute the application and reflect the second change.

In an embodiment, this determining includes determining that a second change has been made to the application by virtualizing the application; and sending an indication of the second change to the server 204, wherein the server 204 is configured to send the user account on the second computing device an indication of the second change, wherein the second computing device is configured to execute the application and reflect the second change.

In an embodiment, determining that a change has been made comprises re-writing in-memory code for a target function on the first computing device. In an embodiment, this determining includes determining that a second change has been made to the application by virtualizing the application; and sending an indication of the second change to the server 204, wherein the server 204 is configured to send the user account on the second computing device an indication of the second change, wherein the second computing device is configured to execute the application and reflect the second change.

In an embodiment, determining that a change has been made comprises virtualizing the application.

Operation 504 depicts sending an indication of the change to a server 204, wherein the server 204 is configured to determine that the user account is logged into a second computing device and send the user account on the second computing device an indication of the change, wherein the second computing device is configured to execute the application and reflect the change.

In an embodiment, sending an indication of the change comprises sending a subset of a user profile of the user account to the server. Since this is per-user, per-application roaming, the full user profile need not be sent when a part of it is updated. In this case, it may be that only the change itself is sent, and that change is then made to a pre-existing user profile on the server or on another computer that the user account exists on.

Operation 506 depicts preventing the change to be indicated to an operating system of the first computing device. In an embodiment, changes to an application's settings that are to be roamed are not stored locally, but exclusively roamed, so they are thus not sent to the first computing device's operating system for implementation.

Figure 6A:
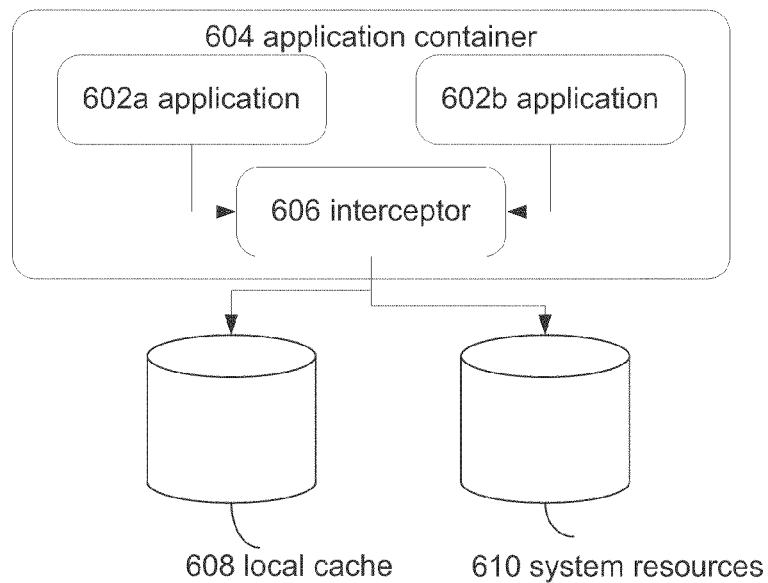
FIG. 6A illustrates per-user roaming profiles.

FIG. 6A illustrates per-user roaming profiles.

Application 602a and application 602b execute within application container 604, which works in conjunction with interceptor 606 to intercept system calls made by application 602a and application 602b. Where those calls represent things to be roamed, interceptor 606 stores them in local cache 608. Where they do not represent things to be roamed, or are to be stored in local cache 608 as well as executed locally, interceptor sends them to system resources 610, system resources corresponding to things such as a registry or a file system.

Figure 6B:
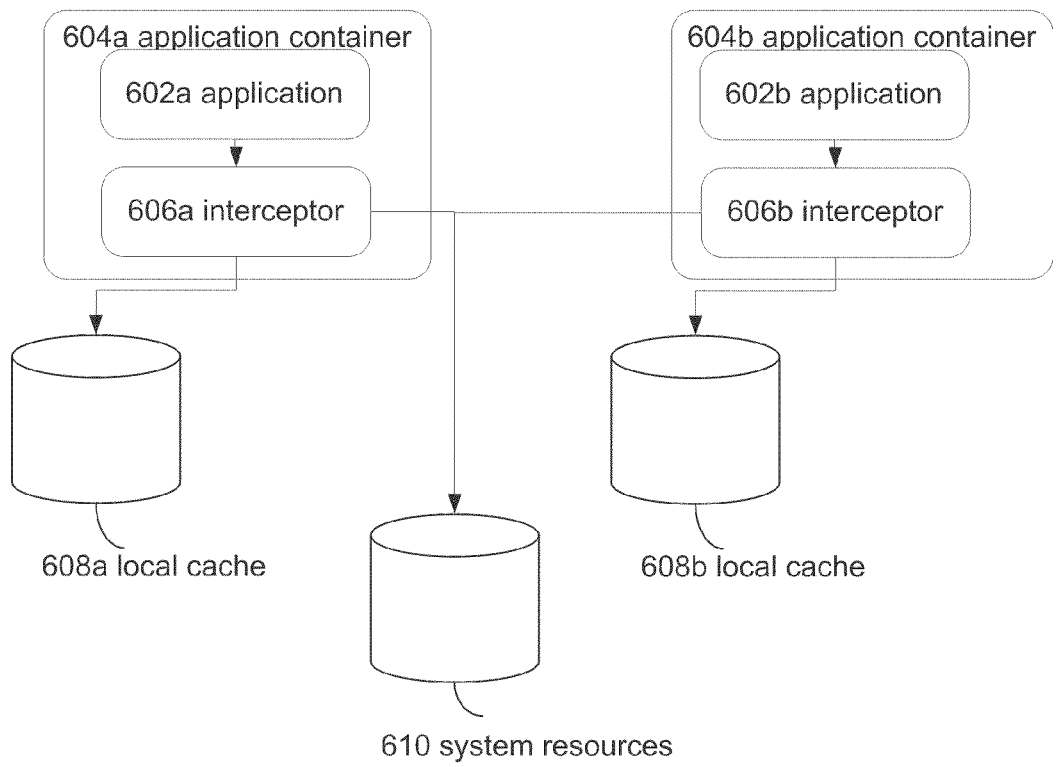
FIG. 6B illustrates per-user per-application roaming profiles.

FIG. 6B illustrates per-user per-application roaming profiles.

In this embodiment, each application executes in a separate application container, having a separate interceptor and a separate local cache. For example, application 602a executes in application container 604a, which works in conjunction with interceptor 606a to intercept system calls made by application 602a. Where those calls represent things to be roamed, interceptor 606a stores them in local cache 608a. Where they do not represent things to be roamed, or are to be stored in local cache 608a as well as executed locally, interceptor sends them to system resources 610, system resources corresponding to things such as a registry or a file system.

Likewise, application 602b executes in application container 604b, which works in conjunction with interceptor 606b to intercept system calls made by application 602b. Where those calls represent things to be roamed, interceptor 606b stores them in local cache 608b. Where they do not represent things to be roamed, or are to be stored in local cache 608b as well as executed locally, interceptor sends them to system resources 610, system resources corresponding to things such as a registry or a file system.

Both application 602a and 602b share system resources 610—those resources of the system upon which both application 602a and 602b are executing.

In FIG. 6A, the embodiment may be thought of as being "per user" roaming in that each user's applications are monitored and roamed together, but each user may separately roam his or her application settings. In contrast, in FIG. 6B, the embodiment may be thought of as being "per user, per application" roaming in that, in addition to each user separately roaming his or her application settings, each application of a given user may be separately monitored and roamed.

Conclusion

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method, comprising:
   determining that a change has been made to an application in a user account for a user on a first computing device;
   in response to determining that the application is prearranged to have its settings shared with a second computing device that the user account may log into, sending an indication of the change to a server, the server being configured to determine that the user account is logged into the second computing device and send the user account on the second computing device the indication of the change, the second computing device being configured to execute the application and reflect the change;
   determining that a second change has been made to a second application in the user account on the first computing device, the second application being a different application than the application;
   determining if the second application is set to not have its settings shared with the second computing device;
   sending the indication of the second change to the server in response to determining that the second application is prearranged to share its settings with the second computing device; and
   otherwise not sending the indication of the second change to the server when it is determined that the second application is prearranged to not have its settings shared with the second computing device.

2. The method of claim 1, wherein determining that the change has been made comprises:
   determining that the change has been made at a driver stack of the first computing device, where the change comprises a change to a file system of the first computing device.

3. The method of claim 2, further comprising:
   determining that a third change has been made to the application by re-writing in-memory code for a target function on the first computing device, where the third change comprises a change to a hierarchical database of the first computing device; and
   sending an indication of the third change to the server, the server being configured to send the user account on the second computing device the indication of the third change, the second computing device being configured to execute the application and reflect the third change.

4. The method of claim 2, further comprising:
   determining that a third change has been made to the application by intercepting a call made to a host operating system by a virtualization layer that virtualizes the application, the call indicating the change, where the third change comprises a change to a hierarchical database of the first computing device; and
   sending an indication of the third change to the server, the server being configured to send the user account on the second computing device the indication of the third change, the second computing device being configured to execute the application and reflect the third change.

5. The method of claim 1, wherein determining that the change has been made comprises:
   re-writing in-memory code for a target function on the first computing device, where the change comprises a change to a file system of the first computing device.

6. The method of claim 5, further comprising:
   determining that a third change has been made to the application intercepting a call made to a host operating system by a virtualization layer that virtualizes the application, the call indicating the change, where the third change comprises a change to a hierarchical database of the first computing device; and
   sending an indication of the third change to the server, the server being configured to send the user account on the second computing device the indication of the third change, the second computing device being configured to execute the application and reflect the third change.

7. The method of claim 1, wherein determining that the change has been made comprises:
   intercepting a call made to a host operating system by a virtualization layer that virtualizes the application, the call indicating the change.

8. The method of claim 1, further comprising:
   preventing the change to be indicated to an operating system of the first computing device.

9. The method of claim 1, wherein the change comprises a change to the application's settings.

10. A computer-readable storage device, comprising computer-executable instructions that when executed on a computing device cause the computing device to perform operations comprising:
    determining that a change has been made to an application in a user account for a user on a first computing device;
    in response to determining that the application is prearranged to have its settings shared with a second computing device that the user account may log into, sending an indication of the change to a server, the server being configured to determine that the user account is logged into the second computing device and send the user account on the second computing device an indication of the change, the second computing device being configured to execute the application and reflect the change;
    determining that a second change has been made to a second application in the user account on the first computing device, the second application being a different application than the application;
    determining if the second application is set to not have its settings shared with the second computing device;
    sending the indication of the second change to the server in response to determining that the second application is prearranged to share its settings with the second computing device; and
    otherwise not sending the indication of the second change to the server when it is determined that the second application is prearranged to not have its settings shared with the second computing device.

11. The computer-readable storage device of claim 10, wherein determining that the change has been made comprises:
    determining that the change has been made at a driver stack of the first computing device, where the change comprises a change to a file system of the first computing device.

12. The computer-readable storage device of claim 11, further comprising computer-executable instructions that when executed on the computing device cause the computing device to perform operations comprising:
    determining that a third change has been made to the application by re-writing in-memory code for a target function on the first computing device, where the third change comprises a change to a hierarchical database of the first computing device; and
    sending an indication of the third change to the server, the server being configured to send the user account on the second computing device the indication of the third change, the second computing device being configured to execute the application and reflect the third change.

13. The computer-readable storage device of claim 11, further comprising computer-executable instructions that when executed on the computing device cause the computing device to perform operations comprising:
   determining that a third change has been made to the application by intercepting a call made to a host operating system by a virtualization layer that virtualizes the application, the call indicating the change, where the third change comprises a change to a hierarchical database of the first computing device; and
   sending an indication of the third change to the server, the server being configured to send the user account on the second computing device the indication of the third change, the second computing device being configured to execute the application and reflect the third change.

14. The computer-readable storage device of claim 10, wherein determining that a change has been made comprises:
   re-writing in-memory code for a target function on the first computing device, where the change comprises a change to a file system of the first computing device.

15. The computer-readable storage device of claim 14, further comprising computer-executable instructions that when executed on the computing device cause the computing device to perform operations comprising:
   determining that a third change has been made to the application by intercepting a call made to a host operating system by a virtualization layer that virtualizes the application, the call indicating the change, where the third change comprises a change to a hierarchical database of the first computing device; and
   sending an indication of the third change to the server, the server being configured to send the user account on the second computing device the indication of the third change, the second computing device being configured to execute the application and reflect the third change.

16. A system, comprising:
   a memory bearing instructions that, upon execution by a processor, cause the system at least to:
      determine that a change has been made to an application in a user account for a user on a first computing device;
      in response to determining that the application is prearranged to have its settings shared with a second computing device that the user account may log into, send an indication of the change to a server, the server being configured to determine that the user account is logged into the second computing device and send the user account on the second computing device the indication of the change, the second computing device being configured to execute the application and reflect the change;
      determine that a second change has been made to a second application in the user account on the first computing device, the second application being a different application than the application;
      determine if the second application is set to not have its settings shared with the second computing device;
      send the indication of the second change to the server in response to a determination that the second application is prearranged to share its settings with the second computing device; and
      otherwise not send the indication of the second change to the server when it is determined that the second application is prearranged to not have its settings shared with the second computing device.

17. The system of claim 16, wherein the instructions that, upon execution by the processor, cause the system at least to determine that the change has been made further cause the system at least to:
   determine that the change has been made at a driver stack of the first computing device, where the change comprises a change to a file system of the first computing device.

18. The system of claim 17, wherein the memory further bears instructions that, upon execution by the processor, cause the system at least to:
   determining that a third change has been made to the application by re-writing in-memory code for a target function on the first computing device, where the third change comprises a change to a hierarchical database of the first computing device; and
   sending an indication of the third change to the server, the server being configured to send the user account on the second computing device the indication of the third change, the second computing device being configured to execute the application and reflect the third change.

19. The system of claim 17, wherein the memory further bears instructions that, upon execution by the processor, cause the system at least to:
   determining that a third change has been made to the application by intercepting a call made to a host operating system by a virtualization layer that virtualizes the application, the call indicating the change, where the third change comprises a change to a hierarchical database of the first computing device; and
   sending an indication of the third change to the server, the server being configured to send the user account on the second computing device the indication of the third change, the second computing device being configured to execute the application and reflect the third change.

20. The system of claim 16, wherein the instructions that, upon execution by the processor, cause the system at least to determine that the change has been made further cause the system at least to:
   re-writing in-memory code for a target function on the first computing device, where the change comprises a change to a file system of the first computing device.

* * * * *